C. E. DAVIS.
MINING MACHINE.
APPLICATION FILED MAR. 10, 1915.

1,283,688.

Patented Nov. 5, 1918.
2 SHEETS—SHEET 1.

Witnesses:

Inventor:
Charles E. Davis.
by Parker & Carter
his Attys.

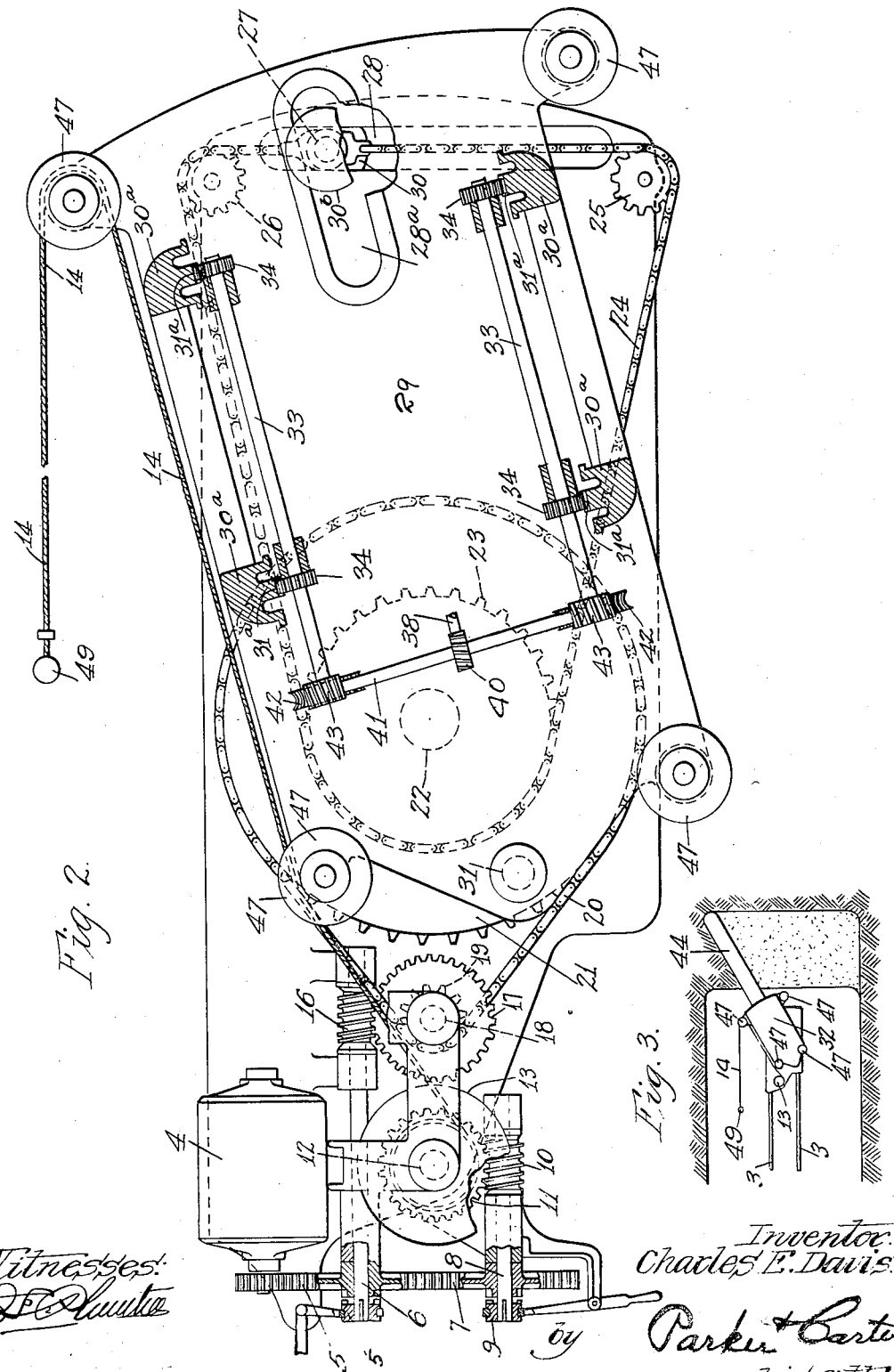
C. E. DAVIS.
MINING MACHINE.
APPLICATION FILED MAR. 10, 1915.
1,283,688.
Patented Nov. 5, 1918.
2 SHEETS—SHEET 2.
Witnesses:
Inventor:
Charles E. Davis
by Parker + Carter
his Attys.

UNITED STATES PATENT OFFICE.

CHARLES E. DAVIS, OF CHICAGO, ILLINOIS, ASSIGNOR TO GOODMAN MANUFACTURING COMPANY, OF CHICAGO, ILLINOIS, A CORPORATION OF ILLINOIS.

MINING-MACHINE.

1,283,688.

Specification of Letters Patent.

Patented Nov. 5, 1918.

Application filed March 10, 1915. Serial No. 13,308.

*To all whom it may concern:*

Be it known that I, CHARLES E. DAVIS, a citizen of the United States, residing at Chicago, in the county of Cook and State of Illinois, have invented a certain new and useful Improvement in Mining-Machines, of which the following is a specification.

This invention relates to mining machines and has for its object to provide a new and improved machine of this description particularly adapted to cut a substantially straight-faced cut. The invention is illustrated in the accompanying drawings, wherein—

Fig. 2 is a sectional view taken on line 2—2 of Fig. 1.

Fig. 3 is a diagrammatic view showing the machine in operation.

Like numerals refer to like parts throughout the several figures.

Figure 1:
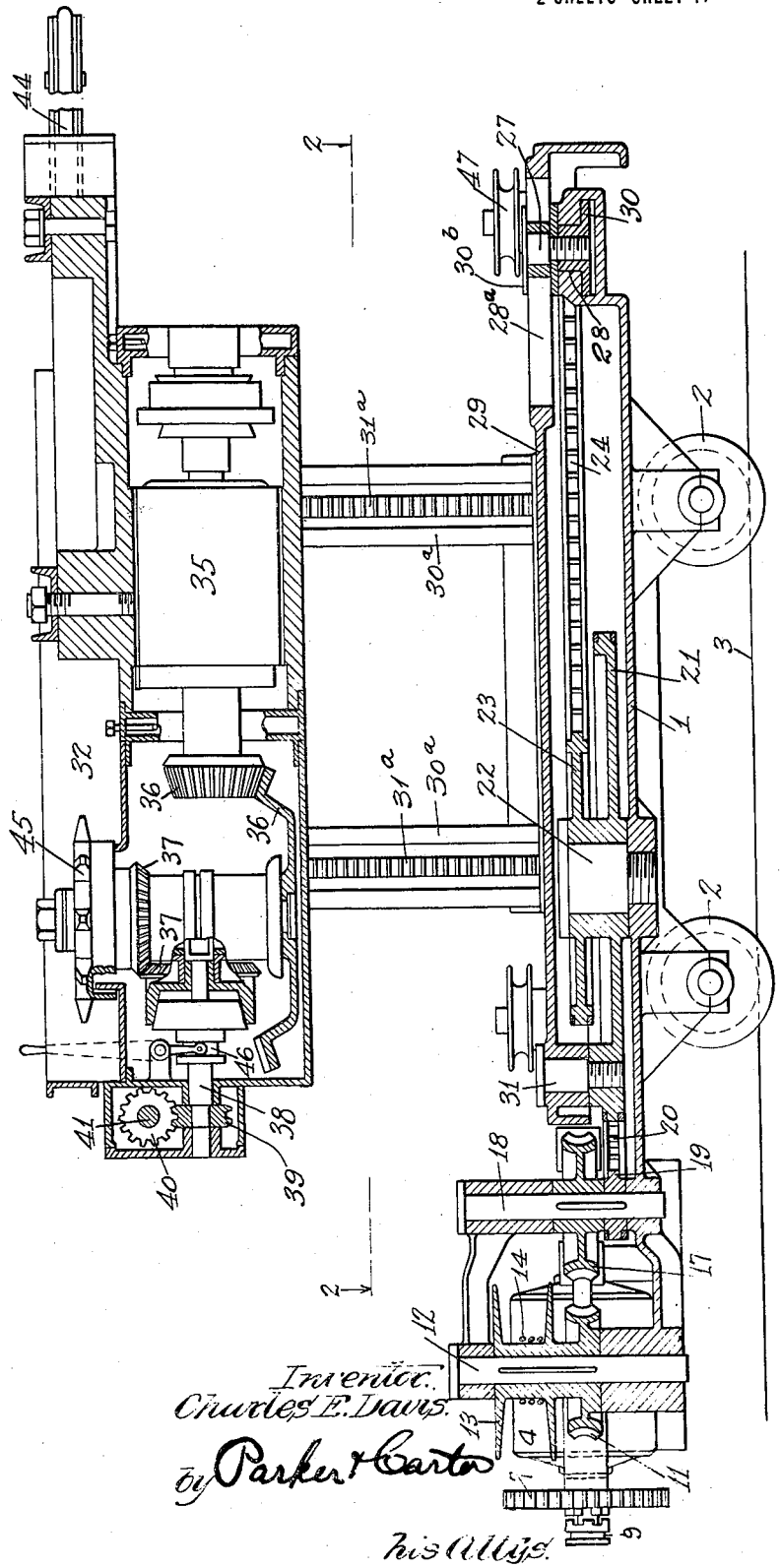
Figure 1 is a vertical section through a machine embodying the invention.

As illustrated in the drawing, I provide a main frame 1 mounted on wheels 2, said wheels adapted to run upon a track 3. Mounted upon this main frame is a motor 4. This motor drives a gear 5 loosely mounted on a shaft 6, said gear 5 driving a gear 7 loosely mounted on the shaft 8. A clutch member 9 is feathered to the shaft 8 and engages the clutch member on the gear 7 so as to connect said gear with the shaft. The shaft 8 is provided with a worm 10 which engages a worm wheel 11 on a shaft 12. This shaft carries a drum 13 about which is wound a cable 14. A sliding clutch member 15 is feathered to the shaft 6 and is adapted to engage a clutch member on the gear 5. The shaft 8 is provided with a worm 16 which engages a worm wheel 17 on a shaft 18. The shaft 18 is provided with a sprocket wheel 19. A chain or other flexible power transmitting device 20 engages this sprocket wheel 19 and also engages a sprocket wheel 21 which works about the center pin 22. Connected with the sprocket wheel 21 is a second sprocket wheel 23, which is provided with a chain or other flexible power transmitting device 24 which passes about sprocket wheels 25 and 26 connected with the main frame 1. The ends of the chain 24 are connected to a sliding pin 27 which slides in a guideway 28 in the main frame 1. This pin passes through a guideway 28ª in the supporting frame 29 and is provided at its upper and lower ends with the enlargements 30ᵇ and 30 to hold the two frames together. The supporting frame 29 is pivotally connected with the sprocket wheel 21 by the pivot 31. The supporting frame 29 is provided with the upstanding supports 30ª provided with the racks 31ª. A cutting element 32 is connected with said racks so that it can be moved up and down thereon. In the construction shown there extends along the sides of the cutting element 32 the shaft 33, see Fig. 2. These shafts are provided with gears 34 which engage the racks 31ª. The shafts 33 are actuated by the motor 35 on the cutting element through the bevel gears 36 and 37, the shaft 38, the worm 39, the worm wheel 40, the shaft 41 and the worm wheels 42 and worms 43. This cutting element is provided with a cutter arm 44 which projects into the coal as shown in Fig. 3, the cutter arm being provided with the usual cutter chain not here shown, said cutter chain being operated by the motor 35 through the sprocket wheel 45, the motor 35 operating either the chain or the wheels 34 which move the cutting element up and down. The connection to said wheels is controlled by the clutch 46. When it is desired to make the cut, the entire machine is moved up to the face of the coal so that the end of the cutter arm is at the point where it is desired to make the cut. The flexible cable 14 which engages the direction changing pulleys 47 is then connected to a fixed point ahead of the machine and the drum 13 rotated so as to force the cutter arm into the coal, the cutter chain being in operation at this time. When the cutter arm has been forced into the coal the proper distance, the rotation of the drum 13 is stopped and the motor 4 is connected with the shaft 18.

It will be seen that when the shaft 18 is rotated, the sprocket wheel 21 will be rotated, and since said sprocket wheel is connected with a supporting frame 29 by the pivot 31, this will move the rear end of the supporting frame. The movement of the sprocket wheel 21 also moves the sprocket wheel 23, and since said latter sprocket wheel is connected with the pivot pin 27, it will be seen that it will cause said pivot pin to slide along the guideway 28, thereby moving the front end of the supporting frame.

In view of the rotation of the sprocket wheel 21 and the connection thereto by the pin 37 of the frame 29, it will be seen that said latter frame will move both laterally and longitudinally, and hence the pin 27 will move along the guideway 28ª. The pin, therefore, has a relative sliding movement with both the main frame 1 and the supporting frame 29. This movement of the frame 29 causes the cutter arm to move across the coal so as to form a substantially straight-faced cut. When the cutter arm reaches the position shown in Fig. 3, the flexible cable is connected to the fixed part 49 back of the front of the machine and the drum 13 set in motion This causes the entire machine to be moved straight back so as to finish the cut.

I have described in detail a particular construction embodying the invention, but it is, of course, evident that the parts may be varied in many particulars and I therefore do not limit myself to the particular construction shown.

I claim:

1. A mining machine comprising a main frame, a supporting frame mounted thereon, a cutting element carried by said supporting frame, two driving wheels mounted upon said main frame, a pivotal connection between one driving wheel and the supporting frame, means for applying power to said latter wheel, a flexible power transmitting device engaging the other driving wheel, a pivot connecting the supporting frame with the main frame, said flexible power transmitting device connected with said pivot, said pivot having a movable connection with the main frame.

2. A mining machine comprising a main frame, a supporting frame mounted thereon, a cutting element carried by said supporting frame, a pivot connecting the supporting frame and the main frame, a sliding connection between said pivot and the main frame, means for applying power to said pivot so as to slide it along the main frame to cause a movement of the supporting frame and a second driving connection to said supporting frame which moves with the supporting frame and with relation to the main frame, said connection coöperating to move the ends of said supporting frame crosswise of the main frame and in opposite directions.

3. A mining machine comprising a main frame, a supporting frame mounted thereon, a cutting element carried by said supporting frame, a rotatable part mounted on the main frame, a connecting part connecting the rotatable part and the supporting frame, a pivot slidably connected with said main frame and said supporting frame, guides on said main frame and said supporting frame, along which said pivot slides, and a connection between said pivot and said rotating part, whereby the pivot is moved along the guides of both of said frames.

4. A mining machine comprising a main frame, a supporting frame mounted thereon, a cutting element carried by said supporting frame, a pivot connecting the two frames, guideways on both frames at an angle to each other, along which said pivot moves, and means for simultaneously moving said pivot along both of said guideways, and a driving connection to said supporting frame at a point at a distance from said pivot, said latter connection causing the portion of the supporting frame adjacent thereto to move crosswise of the main frame.

5. A mining machine comprising a main frame, a supporting frame mounted thereon, a cutting element carried by said supporting frame, a rotatable part mounted on said main frame, a pivot connecting the rotatable part with the supporting frame, a motor, means for connecting the motor with said rotating part, a series of teeth on said rotating part, a flexible belt engaging said teeth, a pivot connecting the main frame and the supporting frame, said main frame and supporting frame provided with guideways at an angle to each other, along which said pivot moves, a connection between said flexible belt and said pivot, and means for directing a portion of said flexible belt parallel with the guideway in said main frame.

6. A mining machine comprising a main frame, a supporting frame mounted thereon, a cutting element carried by said supporting frame, a cutter arm connected with said cutting element, a cutter chain connected with said cutter arm, a motor for moving said cutter chain, a pivot near one end of the supporting frame and connecting the supporting frame and the main frame, said pivot movably connected with one frame and having a sliding connection with the other, means for applying power to said pivot so as to slide it to produce relative movement between the frames, a driving connection to said supporting frame near the other end thereof for moving said latter end crosswise of the main frame.

7. A mining machine comprising a main frame, a supporting frame mounted thereon, a cutting element carried by said supporting frame, a cutter connected with said cutting frame, a cutter connected with said cutting element two separated pivots movably connected with both the main frame and the supporting frame, driving connections to both of said pivots, for moving them simultaneously in opposite directions to produce a movement of said moving frame and cutting element to cause said cutter to be fed to the material acted upon.

8. A mining machine comprising a main frame, a supporting frame mounted thereon, a cutting element carried by said supporting frame, two separated pivots connected with said supporting frame, a rotating part connected with the main frame and a driving connection between said rotating part and both of said pivots, whereby both pivots are moved simultaneously and in opposite directions to give a movement to said supporting frame and cutting element.

In testimony whereof, I affix my signature in the presence of two witnesses this 24th day of February, 1915.

CHARLES E. DAVIS.

Witnesses:
MINNIE M. LINDENAU,
ELLA THIEME.